United States Patent [19]

Razzano et al.

[11] Patent Number: 4,728,567
[45] Date of Patent: Mar. 1, 1988

[54] SILICONE FOAM BACKED POLYIMIDE FILM

[75] Inventors: John S. Razzano, Cohoes; Richard B. Bush, Schenectady, both of N.Y.

[73] Assignee: General Electric Company, Waterford, N.Y.

[21] Appl. No.: 945,937

[22] Filed: Dec. 22, 1986

[51] Int. Cl.$^4$ .................. B32B 3/26; B32B 27/08
[52] U.S. Cl. .................. 428/317.1; 428/215; 428/319.3; 428/319.7; 428/447; 428/473.5
[58] Field of Search ............ 428/304.4, 314.4, 314.8, 428/316.6, 317.1, 317.7, 319.3, 319.7, 319.1, 447, 473.5, 215, 920, 921

[56] References Cited

U.S. PATENT DOCUMENTS

| | | | |
|---|---|---|---|
| 3,514,424 | 5/1970 | Noble et al. | 524/448 |
| 3,640,796 | 2/1972 | Cotelle | 428/316.6 |
| 3,838,097 | 9/1974 | Wirth et al. | 528/170 |
| 3,923,705 | 12/1975 | Smith | 521/117 |
| 4,189,545 | 2/1980 | Modic | 521/131 |
| 4,386,983 | 6/1983 | Hipchen et al. | 156/79 |
| 4,423,102 | 12/1983 | Danton | 428/317.9 |
| 4,438,166 | 3/1984 | Gluck et al. | 428/319.1 |
| 4,476,188 | 10/1984 | Blizzard et al. | 428/447 |

Primary Examiner—William J. Van Balen
Attorney, Agent, or Firm—John W. Harbour

[57] ABSTRACT

There is disclosed a plastic film or metal foil composite sheet containing:
(a) a first layer of plastic film or metal foil having firmly adhered to at least one side thereof,
(b) a second layer of silicone foam.

10 Claims, No Drawings

SILICONE FOAM BACKED POLYIMIDE FILM

The present invention relates to plastic film or metal foil backed with silicone foam. More particularly, the present invention relates to plastic film or metal foil backed with silicone foam to hold the oxidizing or melting material in place upon the application of heat.

BACKGROUND OF THE INVENTION

Plastic film and metal foil have varied uses which require that they withstand the application of heat without oxidizing and flaking away or without dripping. These materials, used today to house electrical equipment, in buildings, in airplanes, in automobiles, and in furniture must meet ever increasing standards for flame resistance.

Plastic film when exposed to flame or high temperatures will begin to run or drip. Often, when the material is flaming, the dripping will spread the fire to rugs or other flammable items which are below. Metal foil, such as aluminum, when subjected to flame will oxidize and shrink or flake away to expose underlying flammable materials to direct flame contact.

It is an object of the present invention to provide a plastic film with reduced tendency to flow and drip with flame or heat contact.

It is a further object of the present invention to provide a metal foil which does not flake away with oxidation.

DETAILED DESCRIPTION OF THE INVENTION

Briefly, according to the present invention there is provided a plastic film or metal foil composite containing:
(a) a layer of plastic film or metal foil having firmly adhered to at least one side thereof;
(b) a layer of silicone foam.

Silicone foams for use herein are presently manufactured by two principle methods. Each method depends upon the in situ generation of hydrogen gas and simultaneous crosslinking of a silicone elastomer. Less preferred methods of blowing silicone elastomer include the use of a blowing agent.

One silicone foam composition suitable for use herein comprises (a) 100 parts by weight of a base vinyl-containing polymer of the formula:

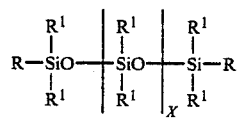

where R and $R^1$ are selected from the class consisting of alkyl radicals of 1 to 8 carbon atoms, aryl radicals, vinyl radicals and fluoroalkyl radicals of 3 to 8 carbon atoms, such that the polymer contains from 0.0002 to 3% by weight vinyl, and x varies such that the viscosity of the polymer varies from 100 to 1,000,000 centipoise at 25° C.; (b) from 0 to 200 parts by weight of a filler; (c) from 100 parts per million to 1.5 parts by weight water; (d) from 1 to 50 parts by weight of a hydride polymer of the formula:

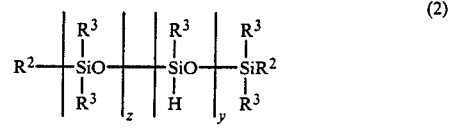

where $R^2$ is selected from the class consisting of hydrogen, alkyl radicals of from 1 to 8 carbon atoms and aryl radicals, and $R^3$ is selected from alkyl and aryl radicals of up to 8 carbon atoms, where the hydride polymer has a hydrogen content varying from 0.3 to 1.6% by weight, where z and y vary such that the polymer has a viscosity varying from 5 to 100 centipoise at 25° C.; and where there is at least 0.2 moles of SiH per mole of water; and (e) from 1 to 250 parts per million of a platinum catalyst. It is preferred that the base vinyl-containing polymer only contain vinyl terminal units, however, it can contain some vinyl on chain units. With respect to the hydride polymer, such polymer must have a hydrogen atom on the polymer chain to produce a suitable foam. However, in addition to the chain hydrogen atoms, there may be present terminal hydrogen atoms. A hydride polymer cannot be used as a cross-linking agent with only terminal hydrogen atoms. As stated above, it is necessary that the composition have at least 0.2 moles of hydrogen in the hydride-containing polysiloxane cross-linking agent for every mole of water to release sufficient hydrogen to produce a suitable foam.

The above composition is utilized to produce a foam by simply mixing the ingredients and allowing them to react in two principle reactions. One reaction will produce hydrogen gas in a reaction between water with hydride polymer and foam the composition. The second reaction will cure the composition to a silicone elastomer in a reaction between vinyl functional groups and hydride polymer. If heat is applied, of course, the reaction will proceed at a very fast rate. This silicone foam composition is further described in U.S. Pat. No. 4,189,545, hereby incorporated by reference.

Another silicone foam composition suitable for use herein comprises (a) an organohydrogensiloxane having an average of at least three silicon-bonded hydrogen atoms per molecule, an average of no more than one silicon-bonded hydrogen atom per silicon atom and organic radicals selected from the group consisting of alkyl radicals having 1 to 6 carbon atoms per radical, phenyl and 3,3,3-trifluoropropyl; (b) a hydroxylated organosiloxane having an average of from greater than 1.0 to 2.5 silicon bonded hydroxyl radicals per molecule and having an average of at least one organic radical per silicon atom selected from the group consisting of alkyl radicals having from 1 to 6 carbon atoms per radical, phenyl and 3,3,3-trifluoropropyl; and (c) a platinum catalyst in an amount of from 5 to about 200 parts by weight platinum per one million parts by weight total composition. The organohydrogensiloxane and the hydroxylated organosiloxane should be present in sufficient amounts to provide a molar ratio of silicon-bonded hydrogen atoms to silicon-bonded hydroxyl radicals of 2.5 to 40.

This silicone composition is easily foamed by simply mixing the ingredients and allowing them to react. The principle reaction produces hydrogen gas to foam the composition and simultaneously crosslinks the polymers to cure the composition.

The mechanism of the principle reaction is that the hydrogen atom of a hydroxy group on the hydroxylated organosilicone reacts with a hydrogen atom on the organohydrogensiloxane producing a molecule of hydrogen and a Si-O-Si bond. This silicone foam composition is further described in U.S. Pat. No. 4,189,545, hereby incorporated by reference.

The ingredients of either of the above suggested silicone foam compositions can be mixed according to common practices. For instance, the hydride polymer or organohydrogensiloxane can be mixed with the platinum catalyst and then mixed with the base vinyl-containing polymer and water or with the hydroxylated organosiloxane. In the alternative, the platinum catalyst can first be mixed with the base vinyl-containing polymer and water or with the hydroxylated organosiloxane and then mixed with the hydride polymer or organohydrogensiloxane as appropriate. Other methods of mixing are also appropriate, for example, the vinyl-containing polymer and water or hydroxylated organosiloxane can be divided into two portions, where one portion is mixed with the platinum catalyst and the second portion is mixed with the hydride polymer organohydrogensiloxane and then the two mixtures are combined to form a foam. Various optional ingredients such as silica filler can be mixed with one or more of the required ingredients as suitable. These "packages" of ingredients can be formulated with any combination of ingredients so long as a premature reaction does not take place before all ingredients are present in the mixture. For purposes of storage, the hydride polymer or organohydrogensiloxane should not be stored as a "package" or mixture with the platinum catalyst because gassing may occur.

To control the foaming and curing reactions which are taking place simultaneously, a platinum catalyst inhibitor, such as polymethylvinylsiloxane cyclic compounds and acetylenic alcohols can be added. The platinum catalyst inhibitors are known in the art and many varieties are available. These inhibitors should however not interfere with the foaming and curing in such a manner that destroys the foam product of this invention. The mixture of ingredients should be placed in the desired place where they are to be used as soon as they are mixed because foaming begins immediately, unless a platinum catalyst inhibitor is used to extend the pot life such that they can be mixed and then put in the desired place of use. The amounts of inhibitors are present in relatively small amounts, such as up to 2 parts by weight polymethylvinylsiloxane cyclics can be used to control the initiation of the foaming and curing. The polymethylvinylsiloxane cyclics are known in the art and can be prepared by hydrolyzing methylvinyldichlorosilane, for example.

The density of the above foams may be lowered where necessary or desirable by the incorporation of MDQ polyorganosiloxane resins. These resins comprise $R_3^4SiO_{0.5}$ (M), $R_2^4SiO$ (D), and $SiO_2$ (Q) units where $R^4$ is selected from substituted and unsubstituted monovalent hydrocarbon radicals. These resins and their use for the above purpose are further described in U.S. Pat. No. 4,418,157, herein incorporated by reference.

Plastic film suitable for use herein may be made of a variety of thermoplastic materials. Suitable plastics include polyolefins, such as, polyethylene, polypropylene, polystyrene, polyvinylchloride, etc.; polycarbonate; poly(alkylene terephthalates), including, poly(ethylene terephthalate), poly(butylene terphthalate), poly(cyclohexane terephthalate), etc; poly(phenylene oxides); polyimide; polyaryl ether; polyamide; epoxides; polysiloxanes; blends of the above; and others. Broadly, the plastic material employed is not critical to the present invention. A preferred well known plastic material is poly(ether-imide). Suitable poly(ether imides) are described in U.S. Pat. No. 3,838,097, Wirth, et al., and U.S. Pat. No. 3,803,085, Takekoshi, hereby incorporated by reference.

The invention herein is generally effective on plastic film or sheet having a thickness from about 1 mils up to about 200 mils. Preferred thicknesses for use herein are from about 5 mils up to about 125 mils. Most preferably, thicknesses range from about 5 to about 100 mils.

Metal foil for use herein includes copper foil, aluminum foil, gold foil, silver foil, and the like. These foils will withstand the application of heat but when contacted with direct flame in thin enough sections will oxide throughout to a brittle oxide, or melt or lose film integrity. The invention herein is effective on thin sections susceptible to such oxidation. Generally, thin sections have a thickness ranging from about 0.1 mil to about 50 mils.

To produce articles of the present invention, the silicone foam composition is applied to at least one face of the plastic film or metal foil and foamed. For best results, the silicone foam composition should be formulated to at most 1,000,000 centipoise at 25° C. and should preferably have a viscosity ranging between about 500 and 500,000 centipoise at 25° C. The object of viscosity control is to obtain good cell formation in the foam. Of course, the foam may be applied to both sides of the plastic film or metal or a single layer of silicone foam may have on both sides a plastic film or metal foil. Additionally, the formulation and conditions of foam should be such as to produce a foam having a density from about 0.08 to 0.4 $g/cm^3$ and preferably from about 0.16 to 0.32 $g/cm^3$.

The silicone foam composition is applied by known methods, for example by roller, by blades, etc. Generally, sufficient silicone foam composition should be applied that the foam thickness is at least about 1.5 mm. Thickness less than this supply almost no structural support for flowing plastic or oxidized metal. The thickness should increase depending upon the plastic or metal thickness, plastic viscosity at sag, expected temperatures, and the degree of fire protection sought. Ordinary foam thickness for use in most composites, i.e. for 1/8 in. polypropylene sheet run from about 6 mm. to about 25 mm.

The silicone foam composition is preferably mixed from packages just prior to application, but it is understood that mixing could be accomplished on the application surface, for example, where low viscosity silicone polymers are employed.

To firmly adhere the silicone foam to the plastic film or foil, it may be necessary to roughen the surface, apply a primer composition, apply an adhesive or to treat the composite in, for example, a post-bake operation. The foamable silicone composition when applied to most plastic films or to metal foil inherently has very low adhesion upon foaming. Thus, where the foamable silicone composition is applied uncured to such a substrate and foamed, the surface should be prepared or modified in order to increase adhesion. One method of preparation is to simply roughen the substrate to increase physical attachment, resulting in firm adhesion. Another method of preparation to obtain firm adhesion is to prime the substrate with, for example, an acrylic primer. Suitable acrylic primers are poly(methylmethacrylates) applied to the substrate from emulsion or solution. Other suitable primers are silicates or silanes such as ethylsilicate and methyl triacetoxy silane. Another method to modify the surface for firm adhesion is to post-bake a plastic film/silicone foam composite. Post-baking should be carried out at a sufficient temperature and for a sufficient time that the surface characteristics are changed to increase adhesion. An already foamed silicone sheet can be firmly adhered to the plastic film or foil with a pressure sensitive acrylic adhesive, with a pressure sensitive epoxy adhesive, or with a pressure sensitive silicone adhesive, etc. Though less firmly adhered composites are useful, it is preferred that the silicone foam be sufficiently adhered to the metal foil or plastic film that the silicone foam fails cohesively rather than adhesively when force is applied to remove it from the foil or film.

One preferred method of applying the silicone foam composition to the plastic film or foil involves passing a film or foil through the nip formed by two rollers with a second sheet or impermeable film, such as polyolefin film. In the nip subsequently formed where the primed face of the plastic film or foil contacts or is adjacent to the second sheet of impermeable film, the uncured silicone foam is injected and allowed to pass between the rollers sandwiched between the surfaces, in controlled amount. Of course, the resultant foam/film or foam/foil composite will have a backing of polyolefin film which can be removed. The use of the second impermeable film, however, controls hydrogen gas escape and prevents the silicone foam from adhering to the roller.

Where the film or foil is not flexible or otherwise suitable for passing between rollers, the foam may be produced in a similar fashion, between rollers sandwiched between impermeable films. The impermeable films would be subsequently removed, and the foam applied to the flexible film or foil with a suitable adhesive.

Foaming of the composition may be accelerated by the application of heat. Too vigorous a foaming action will disrupt cell formation and lead to an irregular foam. However, heat may be used to increase production rates as well as control fabric penetration by the silicone foam composition. The heat may be applied by convection or radiation. The temperature within the foam mass should not exceed about 65° C., however, oven temperature or foam surface temperature may be much higher.

Fillers may be added to the silicone foam composition which are usually added in making such foams. These fillers include fumed silica, diatomaceous earth, zinc oxide, calcium carbonate, crushed quartz, and the like. The maximum amount of filler to be added depends on the desired properties of the foam. Generally, up to about 60% by weight filler may be employed.

To enhance the burn resistance of the above silicone foams, other burn resistant additives may be employed. For instance, per hundred parts of the resin portion of the silicone foam composition, there may be added from 0.1 to 10 and preferably from 0.5 to 2 parts by weight carbon black to enhance the burn resistance of the foam. When carbon black is used, the foams are self-extinguishing in shorter times.

The following examples are presented for illustrative purposes only and should not be construed as limiting the present invention which is properly delineated in the claims.

EXAMPLES

Example 1

Composition A contains 100 parts by weight 80,000 centipoise vinyl terminated polydimethylsiloxane fluid, 25 parts by weight a $MD^{vinyl}Q$ resin, 1 part by weight water, 20 ppm platinum catalyst capable of gelling foam in 20 minutes, 50 parts by weight ground silica filler. Composition B contains 20 parts by weight 80,000 centipoise vinyl terminated polydimethylsiloxane fluid and 80 parts by weight 30 centipoise trimethyl terminated methylhydrogensiloxane fluid. Ten parts by weight of Composition A was combined with one part by weight of Composition B resulting in a 25,000 to 40,000 centipoise silicone foam composition. The silicone foam composition immediately begins to react and cure.

Example 2

The silicone foam composition of Example 1 was mixed and continuously fed into the nip formed by two rollers having two continuous sheets of polyethylene running therebetween. The resultant foam sheet cures to a thickness of 3/16 in. at a density of about 15 lb/ft$^3$ in about 5 minutes and the polyethylene facing is peeled away.

Example 3

A section of the silicone foam sheet of Example 2 is suspended vertically and the flame of a gas burner is applied to the center of one face. A silicon oxide layer immediately forms on the surface. Even with several minutes of continued flame application, the silicone foam sheet does not burn through.

Example 4

A poly(ether-imide) film, ULTEM 100 resin, General Electric Company, having a thickness of 5 mil is suspended vertically and the flame of a gas burner is applied to one face. The film is quickly penetrated by the flame.

Example 5

The silicone foam composition of Example 1 is knifed on to one surface of the poly(ether-imide) film of Example 4 and allowed to stand overnight. The silicone layer cures to a thickness of from ⅛ to 3/16 in. and a density of about 15 lb/ft$^3$. The resultant composite is baked in an oven at 300° F. for about 1 hour to insure adhesion between the silicone foam and the poly(ether-imide). This composite sheet is suspended vertically and the flame of a gas burner was applied to the poly(ether-imide) face. The poly(ether-imide) is consumed and chars at the point of flame contact. After about 2 minutes of exposure, there is no flame penetration and the composite is otherwise unaffected.

Example 6

A glass filled poly(ether-imide) film, ULTEM 2200 resin, General Electric Company, having a thickness of 65 mil is suspended vertically and the flame of a gas burner is applied to one face. The film begins to sag in the area of flame contact and in about 1 to 1½ minutes falls away in this area. The flame completely penetrates the film.

Example 7

Silicone foam composition is applied to one side of the poly(ether-imide) film of Example 6 in the same manner as in Example 5. The resultant composite sheet is suspended vertically and the flame of a gas burner is applied to the poly(ether-imide) face. The polyetherimide is consumed and chars at the point of flame contact. The char pulls away from the foam and forms a carbonized shell at the point of contact. After about 3–4 minutes of exposure, there is no flame penetration and the composite sheet is otherwise uneffected.

Example 8

A blended polycarbonate and poly(ether-imide) film, ULTEM DL 1613, General Electric Company, having a thickness of 65 mil is suspended vertically and the flame of a gas burner is applied to one face. The film begins to sag in the area of flame contact and falls quickly away in this area. The area of sag extends beyond the immediate area of flame contact and combustion is supported by the film for about 30 sec. even after removal of the flame. The flame completely penetrates the film.

Example 9

The film of Example 8 is primed on one side with a solution of a copolymer of MMA with methacryloxypropyltrimethoxysilane in the ethyl acetate to which side the silicon foam composition is applied in the same manner as in Example 5. The resultant composite sheet is suspended vertically and the flame of a gas burner is applied to the film face. The film is consumed and chars at the point of flame contact. After about 2 minutes of exposure there is no flame penetration and the composite sheet is otherwise uneffected.

Example 10

A poly(ether-imide) film, ULTEM 1000 resin, General Electric Company, having a thickness of 65 mil is suspended vertically and the flame of a gas burner is applied to one face. The film begins to sag in the area of flame contact and in about 1 minute falls away. The flame completely penetrates the film.

Example 11

Silicone foam composition is applied to one side of the poly(ether-imide) film of Example 10 in the same manner as in Example 5. The resultant composite sheet is suspended vertically and the flame of a gas burner is applied to the poly(ether-imide) face. The poly(ether-imide) is consumed and chars at the point of flame contact. After about 2 minutes of exposure, there is no flame penetration and the composite sheet is otherwise uneffected.

Example 12

A flame retarded polypropylene film, SFR-PP-A flame retardant, General Electric Company, having a thickness of 125 mil is suspended vertically and the flame of a gas burner is applied to one face. The film quickly chars, sags and begins to fall away. The radiant and convective heat of the flame results in sagging over an area greater than that of immediate flame contact.

Example 13

A silicone foam sheet of Example 2 was applied to one side of the polypropylene film from Example 12 to form a composite sheet. The composite sheet was bonded with silicone contact adhesive layers. The composite sheet was suspended vertically and the flame of a gas burner was applied to a polypropylene face. The polypropylene was consumed and charred in the area of immediate flame contact. After about 2 minutes of exposure, there was no penetration. The polypropylene outside the area of direct flame contact was substantially uneffected with no running or dripping observed.

What is claimed is:

1. A fire resistant composite sheet comprising:
   (a) a first layer of plastic polyimide film having firmly adhered to at least one side thereof,
   (b) a second layer of silicone foam containing platinum catalyst residue.

2. The composite sheet of claim 1 wherein the plastic film has a thickness from about 1 mil to about 200 mils.

3. The composite sheet of claim 1 wherein the plastic film has a thickness of from about 5 mm to about 125 mm.

4. The composite sheet of claim 1 wherein said plastic film is poly(ether-imide).

5. The composite sheet of claim 1 wherein said layer of silicone foam has a thickness of at least about 1.5 mm.

6. The composite sheet of claim 1 wherein said layer of silicone foam has a thickness of from about 3 mm to about 51 mm.

7. The composite sheet of claim 1 which is firmly adhered with a contact or pressure sensitive adhesive.

8. The composite sheet of claim 1 which is firmly adhered through a priming layer.

9. The composite sheet of claim 1 wherein said plastic film is firmly adhered by roughening the plastic film surface.

10. The composite sheet of claim 1 wherein said plastic film is firmly adhered by post-baking.

* * * * *